United States Patent [19]

Riggs

[11] 3,808,404

[45] Apr. 30, 1974

[54] MAGNETIC IDENTIFICATION CARD

[75] Inventor: Dean D. Riggs, Avon Lake, Ohio

[73] Assignee: Magneguide Corporation, Cleveland, Ohio

[22] Filed: Dec. 29, 1971

[21] Appl. No.: 213,280

[52] U.S. Cl. ..................235/61.12 M, 235/61.11 D, 179/100.2 A

[51] Int. Cl. .......................................... G06r 19/00

[58] Field of Search 235/61.12 M, 61.12 N, 61.11 D, 235/61.7 B; 340/149 A; 179/100.2 A

[56] References Cited

UNITED STATES PATENTS

| | | | |
|---|---|---|---|
| 3,471,862 | 10/1969 | Barney | 235/61.11 D |
| 3,627,934 | 12/1971 | Riddle | 179/100.2 A |
| 2,914,746 | 11/1959 | James | 235/61.12 M |
| 3,651,312 | 3/1972 | Barney | 235/61.12 M |
| 3,465,131 | 9/1969 | Ten Eyck | 235/61.11 D |
| 3,613,101 | 10/1971 | Leonard et al. | 235/61.12 M |
| 3,676,644 | 7/1972 | Vaccaro et al. | 235/61.12 M |
| 3,531,627 | 9/1970 | Ham | 235/61.12 M |

*Primary Examiner*—Thomas A. Robinson
*Attorney, Agent, or Firm*—McNenny, Farrington, Pearne & Gordon

[57] ABSTRACT

A personal identification or credit card having a layer of extremely hard magnetic material, such as barium ferrite, for recording data thereon with permanence sufficient to prevent accidental or unauthorized deliberate magnetic alteration or destruction of recorded data. The magnetic layer may be sandwiched between non-magnetic substrate sheets and, optionally, the layer may be provided with discontinuities which represent a preselected code or which are adapted to facilitate magnetic reading of the card in scanning systems.

6 Claims, 10 Drawing Figures

INVENTOR.
DEAN D. RIGGS
BY
McNENNY, FARRINGTON, PEARNE & GORDON
ATTORNEYS

INVENTOR.
DEAN D. RIGGS
BY
McNENNY, FARRINGTON, PEARNE & GORDON

ATTORNEYS

MAGNETIC IDENTIFICATION CARD

BACKGROUND OF THE INVENTION

This invention relates to improvements in identification cards and, more particularly, it pertains to such cards having magnetic properties for storing information thereon.

PRIOR ART

Wallet sized cards, popularly called credit or ID cards, are used for such purposes as identification of the holder for extending credit to him or admitting him to a restricted area. For reasons of security, it is important that the information characterizing the card or its holder be written on the card as permanently as possible to avoid accidental or deliberate obliteration or alteration.

Currently, one of the more popular methods of recording intelligence on such a card is by embossing alpha-numeric characters on coded bars thereon. One of the principal disadvantages of this approach appears where the card is employed in a system where it is read by a machine. Generally, optical reading devices have proven to be limited in reliability and accuracy owing to their sensitivity in operation and maintenance. Moreover, the embossed information, being in view, invites attempts of forgery and alteration. Equipment necessary to produce or alter embossed cards may be relatively simple to procure or construct and, thereby, further invites unauthorized production or alteration of cards.

Other less known card constructions, in the prior art, have included zones of magnetic material, for instance, in the form of a continuous visible strip across one face. These cards have not met with wide acceptance apparently because, as a result of their construction, magnetically recorded information could be easily erased either accidentally or deliberately by exposure to magnetic fields such as may be found in industrial environments around electrical machinery or equipment or fields associated with strong permanent magnets.

The characteristic erasability of these prior magnetic card arrangements stems from the use of conventional magnetic recording materials universally used in other data recording arts such as magnetic tape recording, computer systems, and checking account systems. In these data recording applications, and as they have been applied to prior forms of identification cards, since data is represented as a series of magnetic signals, the magnetic recording media is selected on the basis of signal performance. Emphasis has been placed on either signal fidelity as in the case of tape recording or signal sharpness in on-off recording such as in automated checking account systems. Such emphasis has previously been extended to construction of prior identification cards.

SUMMARY OF THE INVENTION

The invention provides a magnetically encodable ID or credit card having a construction which is, under ordinary circumstances, magnetically indestructable. According to the invention, a card is constructed of individual layers of magnetic and non-magnetic materials. The magnetic material is of the type used to fabricate high energy permanent magnets. Magnetically, the material is substantially harder than the customarily used materials found in read/write data storage systems.

Specifically, the coercive force of the magnetic material is preferably equal or greater than that of barium ferrite i.e., about 2,000 oersteds. This may be compared with magnetic oxides commonly used in magnetic tape recording having much lower coercive force, i.e., 300 oersteds. It has been found that once data has been recorded on such hard material it is not dissipated by exposure to the fields associated with permanent magnets or electromagnetic fields associated with operation of industrial or commercial electrical equipment. Consequently, magnetically stored inforamtion generally cannot be inadvertently erased from a card constructed in accordance with the invention. Moreover, owing to the high magnetic field force necessary to alter the material, forgery or unauthorized alteration of a card is effectively prevented.

In one embodiment of the invention, the magnetic material is arranged as a continuous perforated layer, with the perforations representing a predetermined code. Each perforation, being magnetically inactive, may be distinguished from magnetic nonperforated zones with conventional electronic or other sensing equipment. The code represented by the perforations cannot be easily altered when each character of the code has the same number of perforations, e.g., two perforations in any of a fixed number of positions. Holes added or patched to change the identity of an authentic card may be detected by suitable magnetic reading devices.

In another embodiment of the invention, magnetic material is arranged in a uniformly repeating pattern extending along an axis of the card. This arrangement is particularly suited for magnetic reading by scanning the card with one or more magnetic reading devices. In such applications, the magnetic pattern syncronizes or times the reading of the card by a scanning device according to relative movement between the card and reading device.

Cards constructed in accordance with the invention are adapted to be used with magnetic reading and recording devices which have proven to be superior in reliability as compared to various other commonly used non-magnetic devices. A card, as provided by the invention, offers improved protection against forgery or alteration since the code bearing material need not be visible and since the magnetic fields representing a particular code are imperceptible under unaided human observation. Further, protection against forgery or alteration is provided by the relative sophistication of the electronic equipment necessary to read or record magnetic signals, the general unavailability of such equipment, and the general lack of knowledge of such equipment among the general populace.

Figures 1, 2, 3, 4, 5, 6, 7, 8:
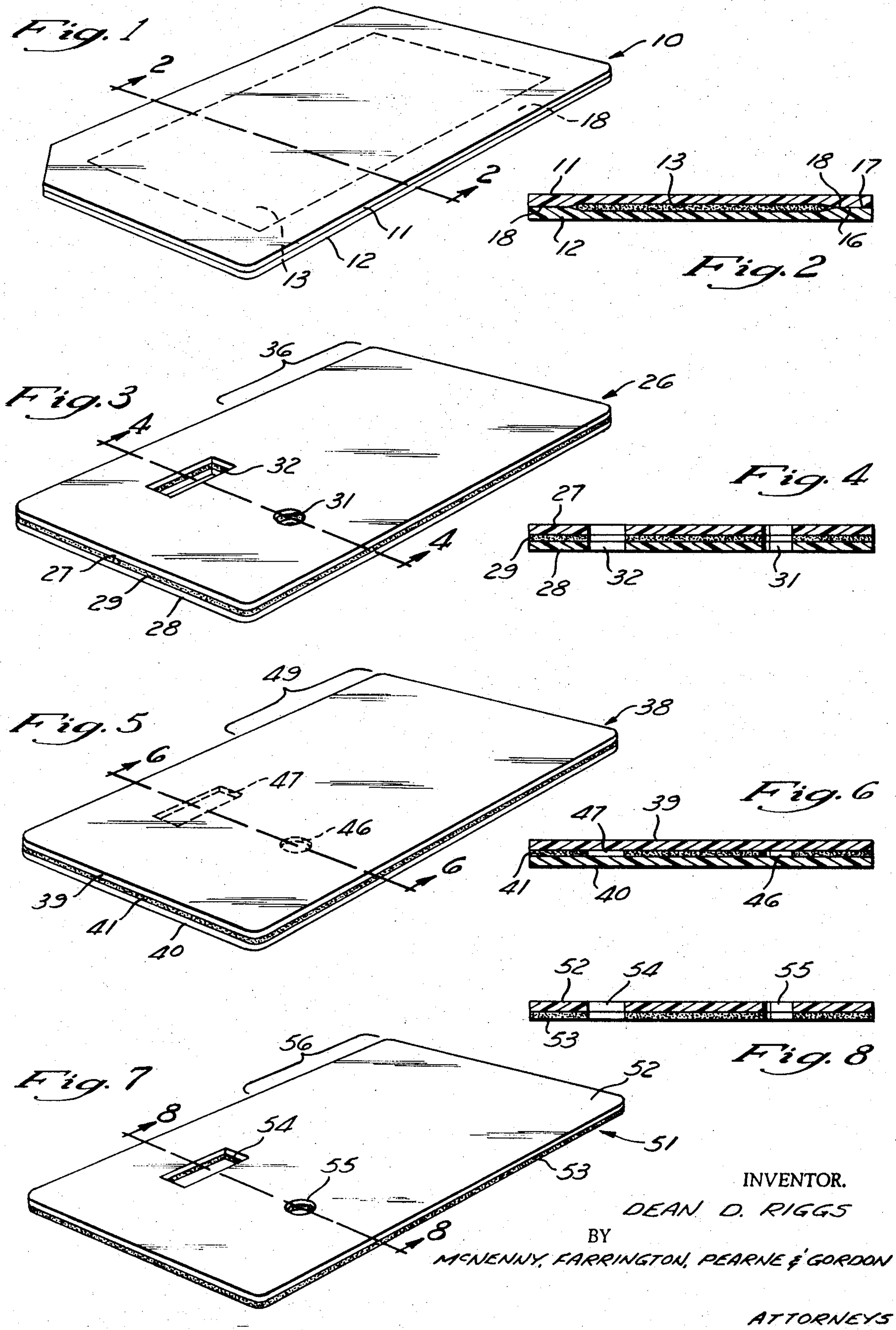
FIG. 1 is a perspective view of a magnetically encodable card according to a first embodiment of the invention.
FIG. 2 is a cross-sectional view of the card of FIG. 1 taken along the lines 2—2 indicated therein.
FIG. 3 is a perspective view of a magnetically encodable card according to a second embodiment of the invention.
FIG. 4 is a cross-sectional view of the card of FIG. 3 taken along the lines 4—4.
FIG. 5 is a perspective view of a magnetically encodable card representing a modification of the second embodiment of the invention shown in FIG. 3.
FIG. 6 is a cross-sectional view of the card as shown in FIG. 5 taken along the lines 6—6.
FIG. 7 is a perspective view of a magnetically encodable card representing another modification of the second embodiment of the invention shown in FIG. 3.
FIG. 8 is a cross-sectional view of the card of FIG. 7 taken along the lines 8—8.

Referring now to the drawings, the Figures illustrate generally flat rectangular cards adapted for use as personal identification or credit cards of a size generally the same as credit cards now in use. For instance, the cards may be approximately 2 ⅛ inches wide by 3 ⅜ inches long and approximately 0.035 inches thick. Cards having this approximate size and having sufficient flexibility may be conveniently carried in a wallet or billfold.

There is illustrated in FIG. 1 a first embodiment of an identification or credit card 10 constructed in accordance with the present invention. The card 10 is a generally flat, rectangular composite or laminated assembly comprising three substantially coextensive layers. A major portion of the card volume is formed by outer layers 11 and 12. The outer layers 11 and 12 of card 10 illustrated in the FIGS. 1 and 2, as well as the outer layers of the cards described below, are preferably formed of an inexpensive, resilient, flexible material such as polyvinyl-chloride or paper. Further, such outer layers or substrates are non-magnetic, i.e., not magnetizable and having a permeability approximately equal to unity.

In the embodiment of FIGS. 1 and 2, the intermediate layer, designated 13, comprises a relatively thin body of magnetic material between the outer non-magnetic plastic layers 11 and 12. The magnetic material lies within a relatively narrow border or margin 18 at the periphery of the card 10 where the outer layers 11 and 12 are secured together by a suitable process such as by bonding or fusing their innerfaces, designated 16 and 17.

In the embodiments illustrated in FIGS. 1 through 6, the magnetic material is disposed on the central or neutral plane running through the center of the card thickness so that stresses on the magnetic material and shearing forces between the contacting faces of the composite layers and the magnetic layer, due to flexing of the card, are minimized.

In accordance with the invention, the magnetic layer of each embodiment includes a dispersion of finely divided magnetic material in a suitable binder. It has been found that magnetic material having an extremely high intrinsic coercive force when used in the magnetic layer of a card successfully resists changes in its magnetized state due to exposure to the magnetic fields of strong permanent magnets in close proximity or electromagnetic fields associated with electronic devices. In particular, two materials, barium ferrite ($Ba\ Fe_{12}\ O_{19}$) and strontium ferrite ($Sr\ Fe_{12}\ O_{19}$) retain their magnetic states with relatively great permanence owing to their exceptionally high intrinsic coercive force. The properties of these materials in a form suitable for use in a binder such as a resin or in an ink is set out below in table form:

| PROPERTY | UNITS | VALUE[1] |
|---|---|---|
| Chemical Composition | | $Ba\ Fe_{12}\ O_{19}$ |
| Average Particle Size | microns | 2.5–4.0 |
| Residual Induction Br | gauss | 3900–3750 min. |
| Intrinsic Coercive Force Hci | oersteds | 2450–2200 min. |
| Peak Energy Product (Bd Hd) max. | gs. oe. | $3.5\times10^6$–$3.25\times10^6$ min. |
| Chemical Composition | | $Sr\ Fe_{12}\ O_{19}$ |
| Average Particle Size | microns | 2.5–4.0 |
| Residual Induction Br | gauss | 3260–3850 min. |
| Intrinsic Coercive Force Hci | oersteds | 3000–4200 min. |
| Peak Energy Product (Bd Hd) max. | gs. oe. | $2.4\times10^6$–$3.45\times10^6$ min. |

[1]These are values determined at 25°C. when checked by wet orienting according to standard lab procedures.

The magnetic materials described above and materials with similar properties, magnetically, are extremely hard. That is, they require relatively strong magnetic fields for their magnetization, but conversely they are very difficult to demagnetize. Consequently, they provide a card structure which is, under ordinary circumstances, magnetically indestructable. Such powdered magnetic materials may be dispersed in a suitable binder to form a coating or ink which may be applied and which will adhere to a sheet or substrate forming one of the non-magnetic layers of the card. For instance, a magnetic layer may be produced economically by printing a film of ink on a non-magnetic substrate sheet in a desired configuration. Such ink may be compounded by substituting magnetic powder having the above described desirable properties for the iron oxide used in present magnetic ink character recognition or MICR systems.

Alternatively, the magnetic layer 13 may be a self-supporting sheet which, in the embodiment of FIGS. 1 and 2, may be captured between the outer non-magnetic layers 11 and 12 without adhesion to the non-magnetic layers. Similarly, in the case of the embodiments of FIGS. 3 through 8, the magnetic layer may be formed from a self-supporting sheet laminated to the non-magnetic substrate sheets by means of heat fusion or a suitable adhesive. Such a sheet may comprise a dispersion of magnetic material in a mass of polyvinyl-chloride plasticized in a suitable press. The magnetic powder need not be magnetically oriented when it is coated or set in a binder.

FIGS. 3 and 4 illustrate a second embodiment of the invention wherein a card 26 comprises a pair of outer non-magnetic substrate sheets or layers 27 and 28 and an intermediate magnetic layer 29. The magnetic layer 29 is coextensive with the outer non-magnetic layers 27 and 28. The card 26 is provided with perforations or holes 31 and 32 punched or otherwise formed completely through its thickness. The holes may be formed in any desired shape such as rectangular as at 32 or circular as at 31. The holes or discontinuities 31 in the layers 27–29, and 32 may be punched according to a predetermined code in the same or like manner as that of Hollerith code or those codes used with punched tape.

In this embodiment, the code, represented by the holes or perforations 31 and 32 may be read, for example, by uniformly magnetizing the card and then by sensing the code with apparatus adapted to differentiate magnetized areas where the card is not perforated and non-magnetized areas defined by the perforations. The code represented by the perforations may be arranged so that alterations by adding perforations render the code meaningless or trigger a security device in the reading apparatus. The reading apparatus may also include circuitry to detect holes plugged in attempts of alteration. The card 26 may be left unperforated on one side or area as at 36 so that information or data may be recorded on the magnetic layer 29 in a conventional manner such as that used for recording on magnetic tape. Information in this area 36 may be erased and rewritten magnetically.

A variation of the embodiment of FIGS. 3 and 4 is illustrated in FIGS. 5 and 6 where a card 38 comprises outer non-magnetic substrate sheets or layers 39 and 40 and an inner magnetic layer 41. The magnetic layer 41 is perforated at 46 and 47 in accordance with a selected predetermined code which may be read in the same manner as that described in relation to the card 26 of FIGS. 3 and 4. Like the previously described card 26, the magnetic layer 41 of the card 38 may be left unperforated at an area 49 where the card may be encoded magnetically in a more conventional manner and where the information may be erased or changed when necessary or desirable. The advantage of this embodiment is that the code represented by the perforations 46,47 is not visible.

FIGS. 7 and 8 illustrate another variation of the embodiment shown in FIGS. 3 and 4. A card 51 comprises a non-magnetic substrate or layer 52 and a coextensive magnetic layer 53. The arrangement of the card 51 may be used where it is desirable or necessary that the magnetic layer 53 be exposed or accessible in a particular system. Like the previously described cards 26 and 38, the card 52 may be provided with perforations 54 and 55 to represent a fixed code and a non-perforated area 56 where the information may be varied.

Figure 9:
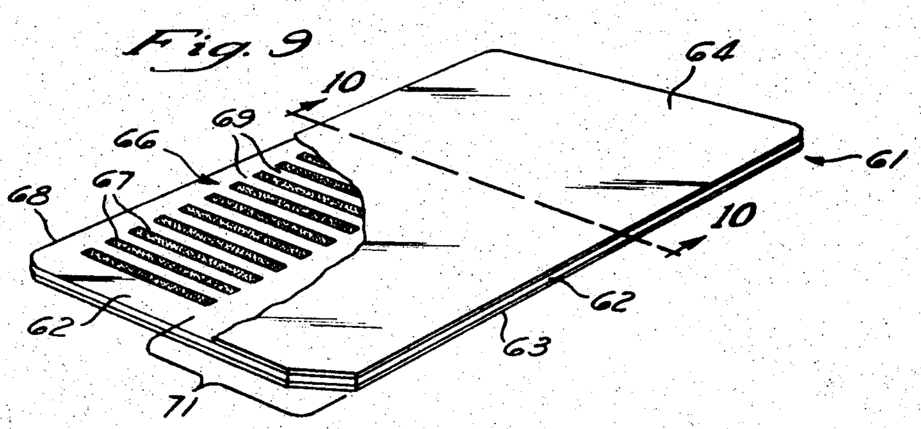
FIG. 9 is a perspective view of a magnetically encodable card representing a third embodiment of the invention.
Figure 10:
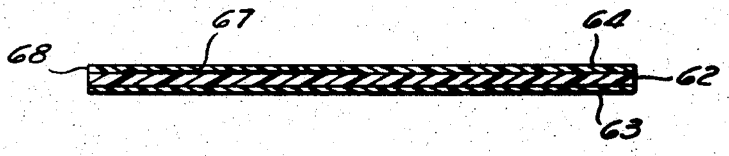
FIG. 10 is a cross-sectional view of the card shown in FIG. 9 taken along the lines 10—10.

Another embodiment of the invention is illustrated in FIGS. 9 and 10 wherein a card 61 comprises a composite of non-magnetic layers and an intermediate magnetic layer. The non-magnetic layers include a central layer or core 62 and a pair of outer protective layers 63 and 64. The core 62 may, for instance, be constructed of polyvinylchloride while the outer layers may be of Mylar having a thickness of 0.0005 to 0.010 inch.

A magnetic layer 66 is provided as a uniformly repeating pattern in the form of a series of strips or bars 67. The magnetic bars or areas 67 may, for example, be printed on the core 62 with magnetic ink, in a thickness of 0.0002 – 0.001 inch before the outer layer or sheet 64 is laminated to the core 62. The elongated rectangular bars 67 are substantially uniform in length and width, are uniformly spaced from one edge 68 of the card core 62, and have a uniform spacing or discontinuity 69 between themselves. With this spacing arrangement, printing or depositing of the magnetic material may be more easily controlled than if the magnetic layer 66 is continuous or solid. Additionally, the outer non-magnetic protective layer 64 may be bonded to the core 62 more reliably and securely than if the magnetic layer was solid since the outer non-magnetic protective layer 64 is not separated from the core 62 by the magnetic material over relatively large areas. An area of the card 61 such as that indicated at 71 may be reserved for embossing data therein.

Separation of the magnetic material into regularly repeating bars 67 permits the card to be used in magnetic scanning devices wherein the bars 67 or portions thereof, are used to synchronize the operation of magnetic heads with the relative motion of the card. That is, each bar 67, is adapted to provide a magnetic signal as it passes a magnetic head and such signals may be used to clock the operation of associated circuitry to permit data to be recorded, erased, or read on successive bars 67 at the proper time. In such a case, precise control of the relative speed between the card 61 and a magnetic head is not critical even if particular ones of the bars 67 are designated to receive certain information. Preferably, the width of the spacing 69 between the bars 67 and the width of the bars 67 are approximately equal to each other and approximately equal to the gap width between the poles of a suitable reading head. Such an arrangement maximizes the flux lines through the head and a maximum peak to peak variation in signal will be provided.

The magnetic layers 13, 29, 41, 53 and 66 of the respective cards may be read or sensed magnetically with conventional magnetic heads. Likewise, the magnetic layers may be magnetized according to any desired code or signal pattern, normally after fabrication of the card, with writing heads capable of producing strong magnetic fields in the magnetic material of at least 8,000 and preferably 10,000 to 15,000 gauss.

In those instances where the magnetic material is disposed at the center of the card thickness, information density in the material may be limited to about 60 flux changes per inch owing to the thickness of the card. The spacing of a magnetic head from the magnetic material allows the field to spread thereby sacrificing signal resolution. This relatively low bit density does not seriously limit the number of applications of the card since information may, if necessary, be stored over substantially all of the area of the card. An advantage of providing the magnetic layer near or at the center of the card, in this context, is that it is more difficult to produce a sufficiently strong field to magnetize the material since a field source or magnetic head is displaced from the material by the thickness of the outer layers which, consequently, makes, unauthorized alteration of the data more difficult.

Preferably, the outer non-magnetic card layers are opaque in order to mask the magnetic layer. Characteristically, magnetic material has a darkish dull color that is esthetically unpleasing. Further, by keeping the data carrying material out of sight, the temptation to alter the data is minimized. Additionally, the visible sides of the non-magnetic layers covering the magnetic material may carry advertising or other visual communications over substantially their entire surfaces. Such visual communication will generally be more attractive on a lighter more esthetically pleasing background than presented by typical magnetic materials.

Although preferred embodiments of this invention have been illustrated, it is understood that various modifications and rearrangements may be resorted to without departing from the scope of the invention.

What is claimed is:

1. An identification card for carrying intelligence in the form of a coded magnetic field comprising a resiliently flexible, substantially flat, rectangular laminate including at least one rectangular non-magnetic layer, and a second layer including a particulate permanent magnet material uniformly distributed therein, said magnet material having a coercivity at least as high as barium ferrite, said magnetic layer having a plurality of discontinuities at preselected areas.

2. An identification card as set forth in claim 1 wherein said discontinuities are holes in an otherwise continuous layer, said holes representing data according to a predetermined code.

3. A wallet sized personal identification card for carrying intelligence in the form of a coded magnetic field comprising a resiliently flexible, substantially flat, rectangular laminate including a non-magnetic rectangular substrate sheet, and a plurality of regularly spaced magnetic zones on said non-magnetic sheet, said magnetic zones including a particulate permanent magnet material having a coercivity at least as great as barium ferrite, said magnetic zones being elongated strips uniformly spaced from an edge of said card and having a uniform width and length.

4. An identification card as set forth in claim 3 wherein said magnetic material is provided in the form of a magnetic ink printed on said non-magnetic substrate sheet.

5. An identification card as set forth in claim 4 wherein said magnetic strips are protected by an outer non-magnetic layer laminated to said substrate sheet at spaces intervening said strips.

6. An identification card as set forth in claim 3 wherein said elongated strips have a width approximately equal to a width of the spacing between adjacent strips.

* * * * *